(12) United States Patent
Saiki (10) Patent No.: US 7,807,290 B2
(45) Date of Patent: Oct. 5, 2010

(54) BATTERY CELL ASSEMBLY

(75) Inventor: Neal T. Saiki, Scotts Valley, CA (US)

(73) Assignee: Zero Motorcycles Inc., Scotts Valley, CA (US)

( * ) Notice: Subject to any disclaimer, the term of this patent is extended or adjusted under 35 U.S.C. 154(b) by 179 days.

(21) Appl. No.: 11/948,663

(22) Filed: Nov. 30, 2007

(65) Prior Publication Data

US 2008/0131764 A1    Jun. 5, 2008

Related U.S. Application Data

(60) Provisional application No. 60/872,112, filed on Dec. 1, 2006.

(51) Int. Cl.
 H01M 2/22 (2006.01)
 H01M 2/24 (2006.01)
 H01M 2/26 (2006.01)
 H01M 6/42 (2006.01)
 H02J 7/00 (2006.01)

(52) U.S. Cl. ........................ 429/160; 429/158; 429/159; 429/161; 29/623.1; 29/623.4; 320/126

(58) Field of Classification Search ................ 429/149, 429/148, 177, 129, 54, 160, 93, 210, 158, 429/159, 161; 29/623.1, 623.4; 235/472.01; 320/116, 126
See application file for complete search history.

(56) References Cited

U.S. PATENT DOCUMENTS

| | | | | |
|---|---|---|---|---|
| 2,042,806 A | * | 6/1936 | Schulte | ........................ 429/127 |
| 4,592,972 A | * | 6/1986 | Juergens et al. | ............. 429/160 |
| 5,169,733 A | | 12/1992 | Savovic et al. | |
| 5,534,368 A | * | 7/1996 | Morris et al. | ................ 429/152 |
| 5,612,151 A | * | 3/1997 | Hughen | ........................ 429/93 |
| 5,879,831 A | * | 3/1999 | Ovshinsky et al. | ............ 429/54 |
| 6,296,970 B1 | | 10/2001 | Killebrew et al. | |
| 6,303,248 B1 | | 10/2001 | Peterson | |
| 6,479,964 B2 | | 11/2002 | Woodroffe et al. | |
| 6,746,797 B2 | | 6/2004 | Benson et al. | |
| 6,820,812 B2 | * | 11/2004 | Bhatia et al. | ........... 235/472.01 |
| 6,844,109 B2 | | 1/2005 | Xing et al. | |
| 2003/0190520 A1 | * | 10/2003 | Amine et al. | ................ 429/149 |
| 2004/0142233 A1 | * | 7/2004 | Park et al. | .................... 429/100 |
| 2007/0026739 A1 | | 2/2007 | Kim et al. | |
| 2007/0252556 A1 | * | 11/2007 | West et al. | .................... 320/116 |

OTHER PUBLICATIONS

"RTP 700, High Density Polyethylene HDPE", RTP Company Data Sheet, Jun. 1, 2005.*
Enpex FPP "Flexible Polyproylene", Evenproducts Data Sheet, 1994.*
PCT International Search Report and Written Opinion, PCT/US07/86180, May 20, 2008, 8 pages.

* cited by examiner

Primary Examiner—Jonathan Crepeau
Assistant Examiner—Kenneth Douyette
(74) Attorney, Agent, or Firm—Fenwick & West LLP (57) ABSTRACT

A battery cell assembly includes a plurality of battery cells. Each battery cell comprises a first end that is positively charged and a second end that is negatively charged. One or more flexible conductors are adapted to electrically connect the plurality of battery cells. A plurality of bands secures the one or more flexible conductors to the plurality of battery cells. The flexible conductors are configured to withstand a current on the order of 300 amps and a minimum temperature of 170° F.

23 Claims, 4 Drawing Sheets

BATTERY CELL ASSEMBLY

CROSS REFERENCE TO RELATED APPLICATIONS

This application claims the benefit of (and priority to) U.S. Provisional Application No. 60/872,112, titled "Method for Connecting Cells in a Battery Assembly," filed Dec. 1, 2006, the contents of which is incorporated by reference in its entirety.

BACKGROUND

1. Field of Art

The disclosure generally relates to the field of battery cell assemblies.

2. Description of the Related Art

Recent advances in batteries based on lithium chemistries have led to the development of small batteries with extremely high energy density. Unfortunately the inherent thermal stability problems associated with lithium based chemistries severely limits the size of these batteries. The safest and most common lithium based battery is the lithium ion cell which are available in a small cylindrical form.

There are many devices, for example electric vehicles, that require large stores of energy for electrical power. To address these needs conventional approaches create a battery assembly out of many individual smaller cells and connect them in both series and parallel. This configuration typically produces a desired combination of output voltage and current. In many configurations using this conventional approach, hundreds of cells may need to be connected together in order to achieve the sought combination of output voltage and current. This task of assembling hundreds of cells together in a robust and economical way is a new challenge that is not adequately solved by conventional assembly methods.

Manufacturing battery cell assemblies requires significant care and precision in order to create a viable product. For example, with respect to these conventional assemblies, cells are electrically connected to each other by cell interconnects. These cell interconnects are typically made from thin strips of nickel or stainless steel. The cell interconnects are connected to each cell by either spot welding or soldering. The cell interconnects must be thin enough to weld to the cell without damaging the cell from excessive welding or soldering heat. In addition, most battery cells, particularly those based on lithium chemistry, are very intolerant of heating. Overheating these types of cells damages the cell chemistry. The result is reduced cell capacity to store energy or premature cell failure.

As for application of the battery cell assemblies, many devices such as electric vehicle applications require large amounts of peak current flowing through the assembly, oftentimes on the order of 300 amps. Thus, the cell interconnects must be large enough to carry this heavy current load. Unfortunately, these large interconnects are too large to weld or solder to the cells without damaging them. Moreover, a reliability problem arises when using large interconnects because they are too stiff. The stiff interconnects do not allow for cell movement that might occur during thermal expansion or vibration.

In an attempt to address these significant shortcomings, conventional approaches have incorporated a complicated solution that requires use of a two part cell interconnect. The first part of this two-part interconnect is a smaller interconnect that can be soldered or welded to the cell. Thereafter, the smaller interconnect is then soldered or welded to a second interconnect that is larger and heavier than the first interconnect. The added complexity of this two part interconnect is magnified as more and more cells are connected together, for example, 100 cells connected together. Further manufacturing costs are increased due to doubling of the number of solder or weld connections that must be made. Moreover, the added connections also double the number of potential failure points in a cell assembly.

Thus, there is lacking, inter alia, a battery cell assembly that allows for high current carrying capacity, robust construction with flexibility, cost effective manufacturing and a reduction in the number of failure points within the assembly.

SUMMARY

One embodiment of a disclosed battery assembly includes a plurality of battery cells, at least one flexible conductor and a plurality of bands. The method to connect the individual battery cells is a mechanical configuration that is highly conductive, durable, reliable and inexpensive to manufacturer. The battery assembly uses flexible conductor to electrically connect each end of the individual battery cells to one another. The flexible conductor is held to the contact points of the individual batteries by a plurality of bands that are stretched over each individual battery. The bands apply a force to the flexible conductor as the bands attempt to return to an unstretched state, thus connecting the flexible conductor to the contact points of the battery cells.

In one embodiment, the flexible conductor is structured from a material such as solder tinned copper braid that can withstand a current in the order of 300 amps. The tinned copper braid is typically constructed from hundreds of fine strands of copper wire that are braided together. The entire braided structure is then pressed to produce a flat thin continuous shape. The resulting copper braid is very flexible can conform to slight misalignments in cells and also withstand thousands of cycles bending without breaking. This is a vast improvement over the solid metal strips commonly used. In addition, the bands in one embodiment are structured from a material that can withstand high temperatures, e.g., a temperature range of 150° F. to 300° F., generated by such configuration, while providing coupling strength to keep the assembly together and allowing for some flexibility in use in larger assemblies.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
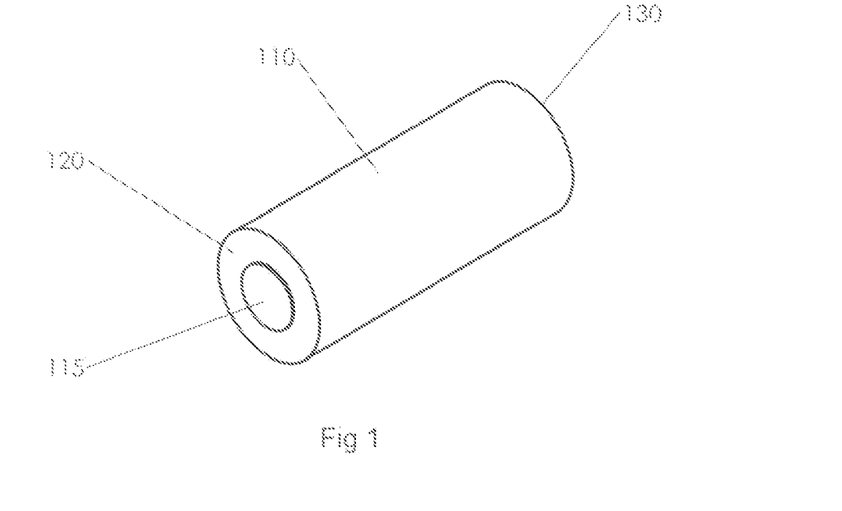
FIG. 1 illustrates one embodiment of a perspective view of battery cell.

FIG. 1 illustrates one embodiment of a perspective view of a battery cell 110. The battery cell 110 includes a body portion with a first end 120 and a second end 130. The first end 120 and the second end 130 are on opposite ends of the body and are oppositely charged. In one embodiment, the boundary between the positive and negative charge occurs at one end. In addition, in one embodiment one or both ends of the battery cell 110 include a contact point 115 (one end illustrated). The contact point 115 may comprise a protrusion, e.g., a raised portion, that forms an isolated contact point. In alternative embodiments, the ends of the battery 110 may be flush or may be indented and adapted to come in contact with a reciprocal contact element. It is noted that the contact point 115 may comprise between 50% to 100% (inclusive) of the surface area of an end, e.g., 120, of the battery cell 110. Further, in one embodiment the body of the battery cell 110 is cylindrically shaped. In alternative embodiments, the body of the battery cell 110 may be shaped in a cube, brick or other four sided volume or in a three sided volume. Other volumes, e.g., having hexagon sides or octagon sides, also may be used.

In one embodiment, the battery cell 110 is a lithium based battery such as a lithium-ion battery. The battery cell 110 can have a minimum capacity of 2900 mAh (milli ampere hour). The mAh is a measure of the amount of current in milliamps that can be delivered from the battery 110 over the period of 1 hour. The capacity dictates the time in which the battery 110 provides power to an electronic device, such as an electric vehicle, and the larger the rating, the longer the battery cell 110 is capable of providing power. In addition, the battery cell 110 has an energy rating of 11 Wh (watt-hour). The Wh is a product of voltage and capacity and is an electrical energy unit that represents the production or consumption of one watt for one hour. The battery cell 110 has a minimum temperature rating of 170° F. The temperature rating of the battery cell 110 must be sufficient so that the battery cell 110 can withstand the varying operating temperature of its surrounding environment, which in one embodiment is in an electric vehicle. A suitable battery cell 110, in one embodiment, is a Molicel® IMR-26700A lithium-ion rechargeable battery, but any battery cell 110 can be used that addresses the electric vehicle power requirements.

The battery cell 110 is configured to provide sufficient energy to a device that draws large amounts of energy, for example, an electric vehicle. The battery cell 110 is configured to store this energy and can be designed into an electric vehicle. A vehicle integrating in the battery cell 110 offers reliable transportation to its user, ensuring that the vehicle does not run out of energy before reaching the desired destination.

Figure 2:
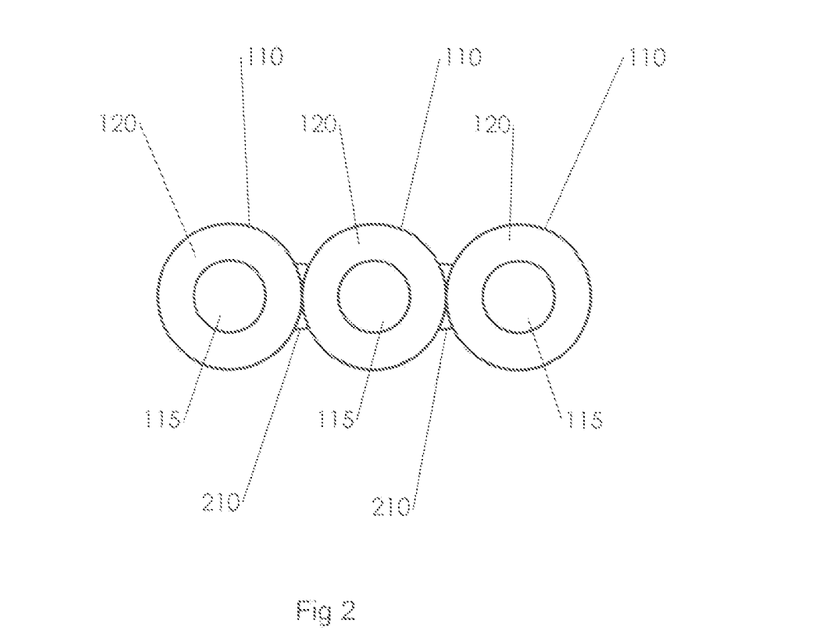
FIG. 2 illustrates cylindrical battery cells coupled with an adhesive.

FIG. 2 illustrates one embodiment of cylindrical battery cells 110 coupled together with an adhesive. An arrangement of three cylindrical battery cells 110 is shown, wherein the three battery cells 110 are positioned with the positive ends of each battery cell 110 facing the same direction forming a parallel connection. Preferably, the battery cells 110 are arranged so that each end 120, 130 of the battery cells 110 is at a similar height to the adjacent battery cell 110. Though only three battery cells 110 are shown, the amount of cells depicted is merely illustrative of the possible amount of battery cells 110 that can be used and any number of battery cells 110 can be joined by the flexible adhesive 210. In alternative embodiments, the body of the battery cell 110 may be shaped in a cube, brick or other four sided volume or in a three sided volume rather than a cylindrical body. Other volumes, e.g., having hexagon sides or octagon sides, also may be used. The alternative body of the battery cell 110 may be beneficially used in situations where the space confining the battery assembly is prohibitive of cylindrical battery cell usages.

The portions of the battery cell 110 that are in contact with an adjacent battery cell 110, are applied a flexible adhesive 210 and each adjacent battery cell 110 is joined so that the positive end of each battery cell 110 is facing the same direction. The application of flexible adhesive 210 beneficially allows no movement between the cells in the direction of the cylindrical axis, thus maintaining proper alignment of the battery cells 110. Though no movement occurs in cylindrical axis, the flexible adhesive 210 allows a slight amount of bending in the plane perpendicular to the cylindrical axis. The slight bending in the plane perpendicular to the cylindrical axis prevents the adhesive joint from failing due to impacts or vibration during vehicle movement.

In one embodiment, the flexible adhesive 210 is liquid neoprene. Liquid neoprene is an adhesive based on a family of polychloroprene (polymer form of Chloroprene) and is known for its high cohesive strength and its ability to maintain its elastic properties over a wide temperature range. Because liquid neoprene maintains its elastic properties over a wide temperature range, the adhesive joint is unlikely to fail when the battery cells 110 are exposed to varying environment temperatures due to the electric vehicle traveling to diverse areas where temperature is not static.

It is noted that the disclosed embodiment is not limited to the use of liquid neoprene as the flexible adhesive 210. In alternative embodiments, any flexible adhesive 210 can be used that can withstand a temperature in excess of 150° F. For example, construction adhesive or silicone adhesive can be used. Alternatively, epoxy, which creates a more rigid joint, can be used if less movement in the plane perpendicular to the cylindrical axis is desired. Alternatively, the battery cells 110 can be connected together by a mechanical structure such as a band, in addition to the flexible adhesive 210. In alternative embodiment, it is also possible to forgo the flexible adhesive entirely if the battery assembly is externally supported or if the battery assembly is not subject to extreme vibration or shock loading.

In an alternate embodiment, the battery cells 110 can be arranged so that at each end 120, 130, the adjacent battery cell 110 would be an opposite charge, thus alternating between positive and negative ends. The type of arrangement forms a series connection and can be used to produce a desired voltage and current if a parallel connection cannot be used to produce the desired voltage and current. The examples shown are merely illustrative of the possible configurations that can be used.

Figure 3A:
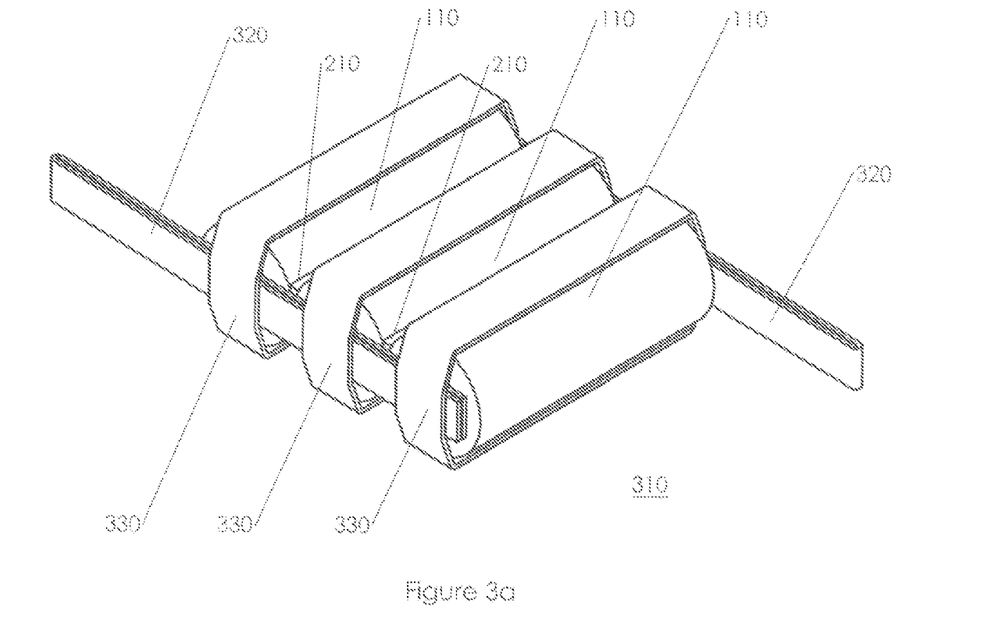
FIG. 3a illustrates a perspective view of a battery cell assembly using two flexible conductors.

FIG. 3*a* illustrates perspective view of a first embodiment of a battery cell assembly 310. The first embodiment of a battery cell assembly 310 includes individual battery cells 110 that are coupled to one another by flexible adhesive 210 as described above with FIG. 2. The individual battery cells 110 are arranged in a parallel configuration where the positive end of each battery cell 110 is facing in the same direction as an adjacent battery cell. The battery cells 110 in the battery cell assembly 310 are also arranged so that each end of the battery cells 110 is at a similar height to an adjacent battery cell, wherein the height is referenced from a stationary point. A flexible adhesive 210 is applied to at least a portion of a body of a battery cell 110 that is in contact with a body of an adjacent battery cell. The flexible adhesive 210 can be liquid neoprene, as discussed above with FIG. 2, although as noted previously any flexible adhesive can be used that can withstand the physical characteristics of the operational battery cell assembly.

The first embodiment of the battery cell assembly 310 comprises a parallel configuration of a battery cell assembly 310. In this configuration the positive ends of the battery cells 110 are mechanically connected by a first flexible conductor 320 and the negative ends of the battery cells 110 are likewise connected by a second flexible conductor 320. The flexible conductor 320, in one embodiment, is made from woven copper braid as further discussed below. The first flexible conductor 320 is positioned in a manner that the width of the flexible conductor 320 is placed across the contact points 115 of the positive ends of the battery cells 110. The flexible conductor 320 extends beyond the end of the first or last cell to provide an electrical contact point for the entire battery cell assembly 310, 311.

The second flexible conductor 320 is positioned in a similar manner where the width of the second flexible conductor 320 is placed across the contact points of the negative ends of the battery cells 110 and one end of the second flexible conductor 320 extends beyond either the first or last cell to provide an electrical contact point for the entire battery cell assembly 310. The sections of the flexible conductor 320 which extend beyond the entire battery assembly act as polar (positive on one end and negative on the other end) contact points for connection to an electronic device, for example, an electric motor. By using a fastener, e.g., a clamp or adhesive that permits conduction, the contact points (the extended sections of the flexible conductor 320) of the battery assembly can be secured to the lead terminals of the electronic device.

Figure 3B:
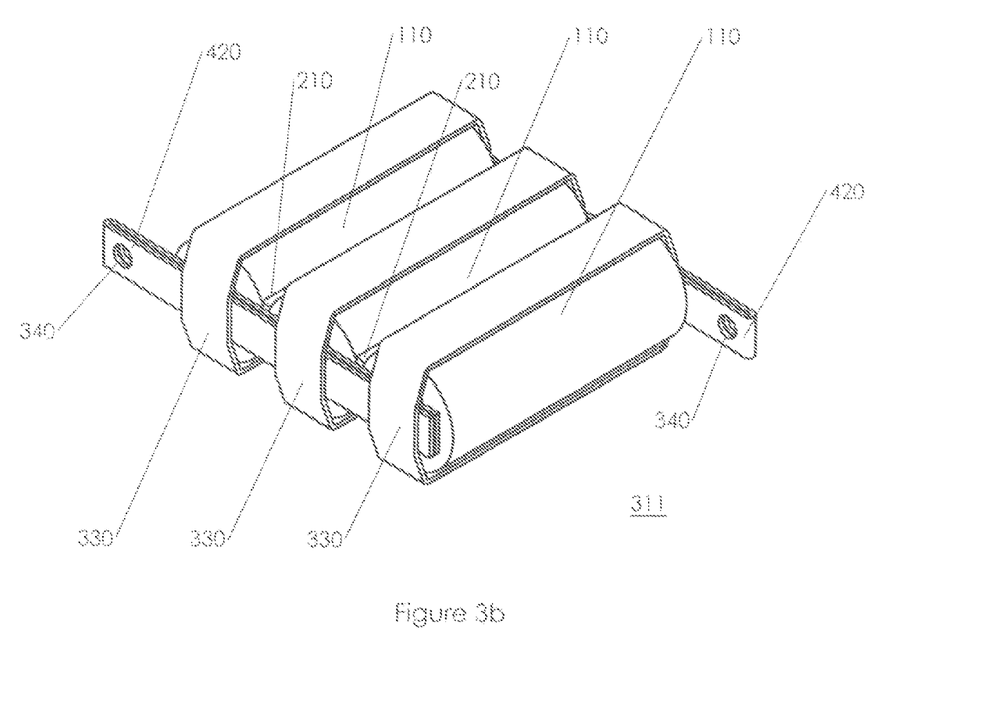
FIG. 3b illustrates a perspective view of a battery cell assembly using two flexible conductors with a hole pressed into one end of each of the flexible conductors.

Referring to FIG. 3*b*, a second embodiment of a battery cell assembly 311 also includes a section of a flexible conductor 420 that extends beyond the first or last cell. In this embodiment, holes 340 are machined into the flexible conductor 420. Because the flexible conductor 420 is made from woven braid of copper, as further discussed below, a conical object can be pressed into the flexible conductor separating the individual braids of copper to form a circular hole 340. The circular hole 340 is structured to provide a contact point for connection to an electronic device, such as an electric motor. A fastener, such as a nut and bolt, can be used to attach the flexible conductors 420 to the lead terminals of the electronic device in order to create a secure connection for current to flow.

In another embodiment, the battery assembly 310 can be connected to an additional battery assembly 310 in a daily chain arrangement to create a series connection between the battery assemblies 310. Any number of battery assemblies can be coupled together to produce a desired combination of output voltage and current. The configuration of a series connection is further described below.

Figure 3C:
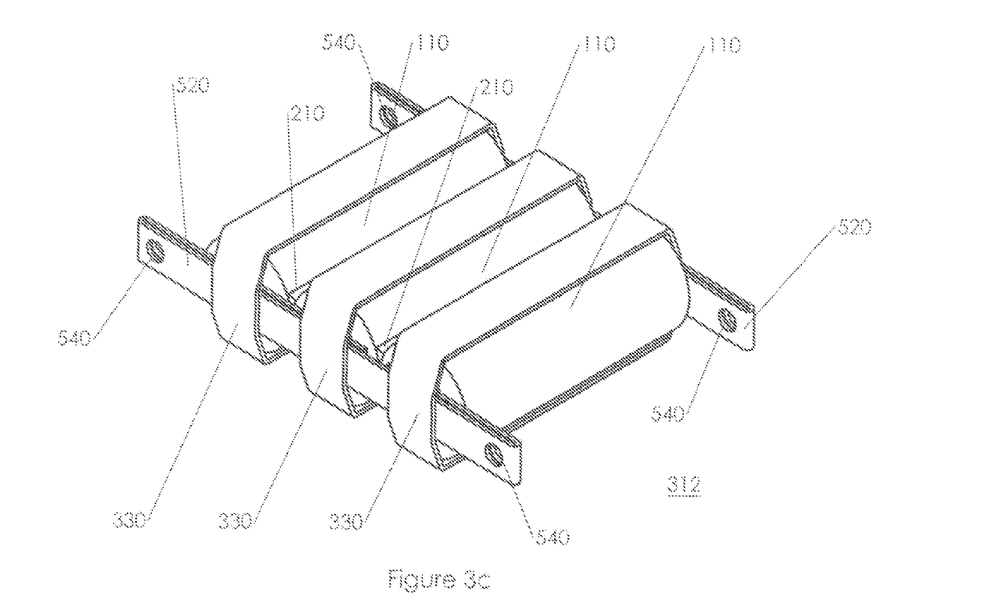
FIG. 3c illustrates a perspective view of a battery cell assembly using two flexible conductors with a hole pressed into the ends of each of the flexible conductors.

Referring next to FIG. 3*c*, a third embodiment of a battery cell assembly 312 illustrates incorporating flexible conductors 520 that extend on each end beyond the first and last cells. The extensions on either end of the conductors 520 provide contact points for the entire battery assembly 310. Each end of one or both conductors 520 may include holes 540 for use in securing the conductors, and thus the battery assembly 312, to other objects, e.g., an electric motor or another battery assembly.

Having the flexible conductor 520 extend beyond the first and last cell beneficially provides multiple points of contact for the entire battery cell assembly 310. This structural configuration provides flexibility when connecting the battery cell assembly 310 to an electronic device that may have reciprocal contact points which are not conveniently located for coupling with the power terminals of the battery cell assembly 312. A fastener, e.g., a nut and bolt, can be used to attach one or both ends of the flexible conductors 520 to lead terminals of the electronic device in order to create a secure connection for current to flow. In another embodiment, the battery assembly 310 can be connected to an additional battery assembly 310 to create a parallel connection between the battery assemblies 310. Any number of battery assemblies can be coupled together to produces a desired combination of output voltage and current.

Figure 3D:
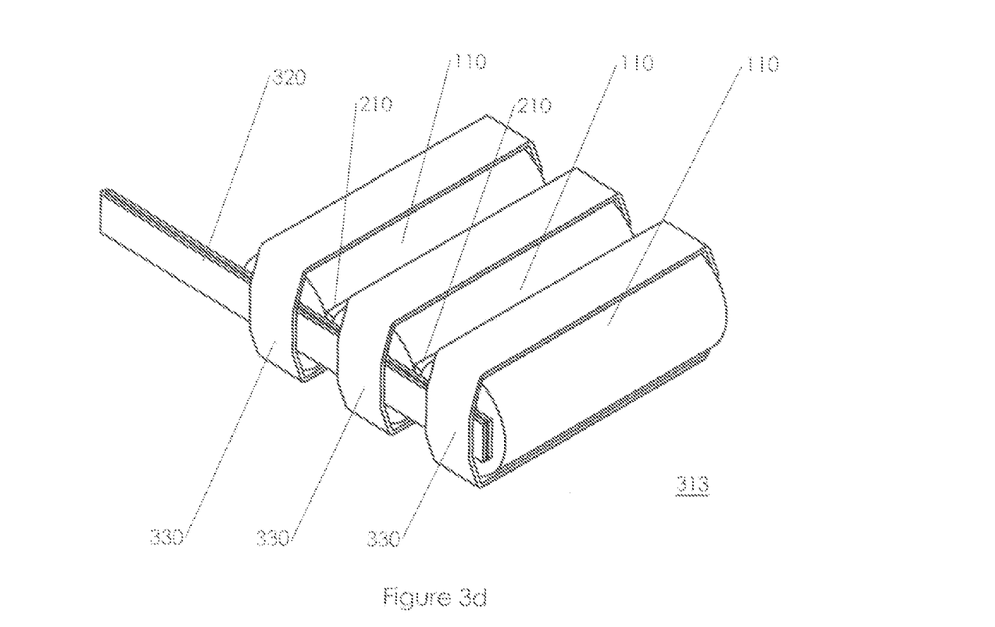
FIG. 3d illustrates a perspective view of a battery cell assembly using a single flexible conductor with heat shrink wrap surrounding the battery cell assembly.

FIG. 3*d* illustrates a fourth embodiment of a battery cell assembly 313. In this embodiment a single flexible conductor 320 is coupled with a contact point on one end of the grouping of battery cells 110. In this configuration, the second end of the grouping of battery cells is not coupled with another flexible conductor. The second end of the grouping of battery cells can be coupled via conventional techniques using interconnects or any other technique that can electrically connect the battery cells. The flexible conductor 320 extends beyond the first or last cell of the battery assembly 313 to create a contact point for the entire battery assembly 313. The flexible conductor 320, in FIG. 3*d*, can be configured in various arrangements, as previously discussed above, such as having a hole pressed into the end of flexible conductor 320 which extends beyond the battery assembly 310 or having the flexible conductor 320 extend beyond the first and last battery cell.

The flexible conductor 320, in one embodiment, is made from solder tinned copper braid. The tinned copper braid is typically constructed from hundreds of fine strands of copper wire that are braided together. The entire braided structure is then pressed to produce a flat thin continuous shape. The flexible conductor 320 provides multiple contact points on the charged end of the battery cells 110. Each strain of the copper braid comes into contact with a contact point at the end of each battery cell 110 acting as an individual strand of conductive wire. The cumulative strands of wire thus maximizes the entire contact point of the battery cell 110 as the flexible copper braid 320 is in contact with the entire contact point of each battery cell 110. Unlike conventional designs, the disclosed configuration uses a large connector with a large contact region (contact point) without the concern of avoiding damage to the battery cells due to excessive welding or soldering heat when mounting the connectors. The flexible conductor 320, 420, 520 is the pathway for current to travel within an electronic circuit. Moreover, the disclosed design creates a large contact point on the battery cell 110 to provide a pathway sufficient for the large amount of current needed to power larger, more energy intensive electric motors, for example, those powering an electric vehicle.

It is noted that for ease of discussion reference may only be made to flexible conductor 320, but is understood to include other embodiments, e.g., flexible conductors 420, 520. In the embodiments illustrated and described in FIGS. 3a-3d, the flexible conductor 320 (or 420, 520) is folded in half to double the thickness of the conductor. This structural configuration provides added current carrying capability because the amount of current the flexible conductor 320 is capable of handling is increased, due to the larger (by folding the flexible conductor 320 in half) cross sectional area that is in the direction of current flow. Additionally, the copper braid could be a single layer or multiple layers can be used to provide the required current carrying capability while still maintaining the flexibility necessary to make good electrical contact between the flexible conductor 320 and the charged end of the battery cell 110.

The flexible conductor 320 is held to each individual battery cell 110 by a band 330. Though the band 330 is substantially rigid, the band 330 is able to secure the flexible conductor 320 to the contact points of the battery cell 110 through the inherent properties of the band 330. When the band 330 is stretched over the body of the battery cell 110, the band 330 inherently attempts to return to its unstretched state. During this process, the band 320 mechanically secures the flexible conductor 320 to the contact point of the battery cell 110 by applying force to the flexible conductor 320 as the band 320 attempts to return to its unstretched state. In one embodiment, each individual battery cell 110 has a band 330 secure a section of the flexible conductor 320 to the contact point of the battery cell 110. In an alternate embodiment, a single band 330 that is large enough to cover the entire battery cell assembly 310 can be used.

The bands 330 are made from any material that is substantially rigid, yet allows some flexibility to contour to the shape of the battery cells 110. In another embodiment, the bands 330 are made from any number of elastomeric materials such as rubber, synthetic rubber or a combination of elastomeric materials. The band 330 must be sufficient in size and thickness to secure the flexible conductor 320 to the battery cell contact points 115. Additionally, the bands 330 must be able to withstand high temperatures, for example, a temperature range of 150° F. to 300° F. in which the bands 330 will be exposed.

Figure 4:
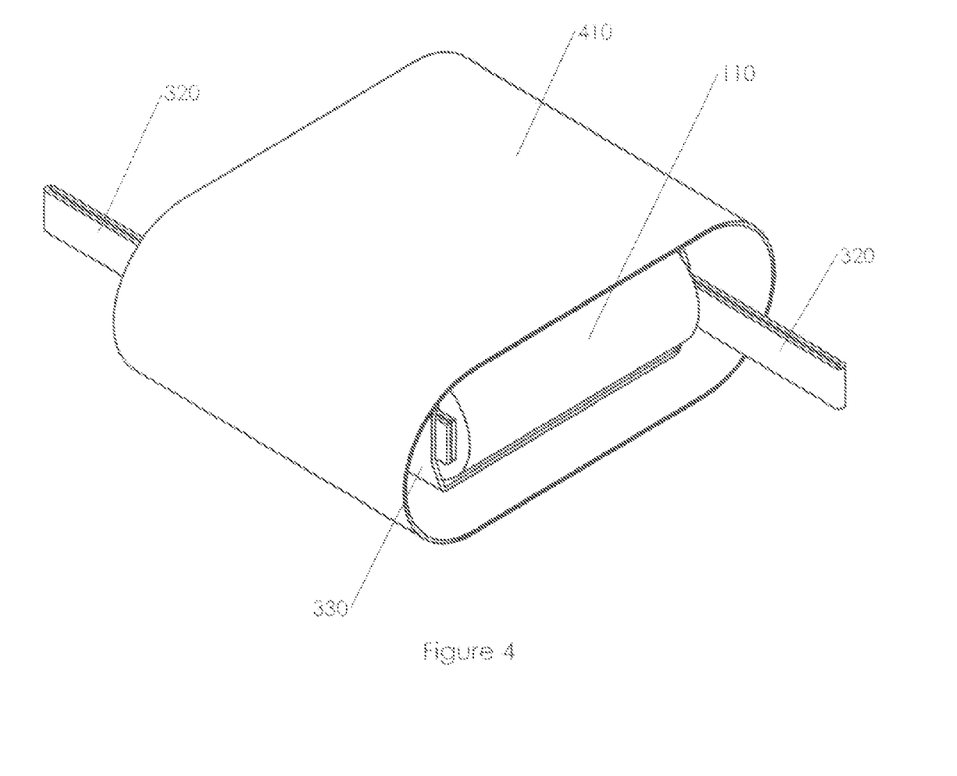
FIG. 4 illustrates a perspective view of a battery cell assembly with heat shrink wrap surrounding the battery cell assembly.

Referring to FIG. 4, the battery cell assembly 310 can be wrapped in heat shrink wrap 410 to further protect the assembly from abrasions and to prevent the bands 330 from moving due to vibration. FIG. 4 illustrates the heat shrink wrap 410 around the entire battery assembly 310 prior to the application of heat which would contour the heat shrink wrap 410 to the shape of the battery assembly 310. Heat shrink tubing is manufactured from a thermoplastic material such as polyolefin, fluoropolymer (such as FEP, PTFE or Kynar), PVC, neoprene, silicone elastomer or Viton. The example materials of heat shrink tubing are merely illustrative of the various materials that can be used and any heat shrink wrap material can be used that suits the given application.

In an alternative embodiment, a series configuration of a battery cell assembly 310 can be used. The battery cells 110 in the battery cell assembly 310 are arranged so that each end of the battery cell 110 is at a similar height to the adjacent battery cell 110. Unlike the parallel configuration, the positive terminals of each individual battery cell 110 do not face the same direction. The battery cells 110 are arranged in a manner that the adjacent battery cell contact point is of the opposite charge. Instead of a single first flexible conductor 320 connecting the positive ends of all the battery cells 110 and a single second flexible conductor 320 connecting the negative ends of all the battery cells 110 as shown in FIG. 3, a plurality of flexible conductors 320 would be used to connect the battery cells 110 in a daisy chain manner which is further described below.

At the first and last cell of the battery assembly 310 in a series configuration, the first and last battery cell 110 each has a flexible conductor 320 extending beyond either a positive end or negative end which serves as the contact points for the entire battery cell assembly 310. The remaining battery cells 110 would be connected in a daisy chain manner. For example, if the first battery cell 110 has a flexible conductor 320 in contact with its negative end, the positive end of the first battery cell 110 would be connected to the adjacent cell's negative end by another flexible conductor 320. The positive end of the adjacent cell would be then be connected by another flexible conductor 320 to its adjacent cell's negative end. This process would repeat until all the battery cells 110 are connected in a similar configuration.

In a series configuration of the battery assembly 310, the various parallel configuration arrangements discussed above can be applied. The various arrangements would be chosen based on which arrangement best suits the given application for a particular electric motor, for example, one that is installed within (or to) an electric vehicle such as a two-, three-, or four-wheeled electric-motor vehicle or an electric motor boat.

As shown by the figures described above, the unique method for connecting battery cells 110 in a battery cell assembly 310 provides a reliable connection without the problems of heat damage from welding conventional connectors to the battery cells 110 and further provides a more robust connection between the cells due to the ability of the assembly to flex without a loss of connection between the battery cells 110. The battery cell assembly 310 also provides a quick and efficient manner to manufacture, repair and replace battery cells 110 in the battery assembly 310 as no welding is needed.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for mechanically connecting individual battery cells in a battery assembly through the disclosed principles herein. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

What is claimed is:

1. A method for mechanically connecting a plurality of cylindrical battery cells in a battery cell assembly using one or more copper braids and one or more bands, wherein each cylindrical battery cell comprises an elongated body section with a first contact point end that is positively charged and a second contact point end that is negatively charged, the method comprising:
   arranging the plurality of cylindrical battery cells such that the first contact point ends of the plurality of cylindrical battery cells face a same direction;
   placing a single first copper braid across the first contact point ends of the plurality of cylindrical battery cells;
   placing a single second copper braid across the second contact point ends of the plurality of cylindrical battery cells; and
   wrapping a single band around each of the plurality of cylindrical battery cells securing the first contact point end of each of the plurality of cylindrical battery cells to a portion of the single first copper braid that is in contact with the first contact point end thereby electrically connecting the first contact point ends and securing the second contact point end of each of the plurality of cylindrical battery cells to a portion of the single second copper braid that is in contact with the second contact point end thereby electrically connecting the second contact point ends.

2. The method of claim 1, further comprising attaching the body section of each of the plurality of cylindrical battery cells to each other using an adhesive.

3. The method of claim 2, wherein the single first copper braid and the single second copper braid comprises a plurality of conductive wire.

4. The method of claim 2, wherein the adhesive is configured to be flexible.

5. The method of claim 1, further comprising arranging the plurality of battery cylindrical cells to have a similar height to the adjacent cylindrical battery cell, wherein the height is referenced from a stationary point.

6. The method of claim 3, further comprising folding the single first copper braid or the single second copper braid in half to double the thickness.

7. The method of claim 6, wherein the single first copper braid or the single second copper braid comprises multiple layers of copper braid.

8. The method of claim 1, further comprising wrapping the cylindrical battery cell assembly with heat shrink wrap.

9. The method of claim 1, wherein the single band is chemically adapted to withstand a temperature of greater than 170 degrees F.

10. The method of claim 8, wherein the single first copper braid and the single second copper braid extends beyond a first cylindrical battery cell of the plurality of cylindrical battery cells or a last cylindrical battery cell of the plurality of cylindrical battery cells.

11. The method of claim 8, wherein the single first copper braid and the single second copper braid extends beyond a first battery cell of the plurality of cylindrical battery cells and a last cylindrical battery cell of the plurality of cylindrical battery cells.

12. A cylindrical battery cell assembly comprising:
   a plurality of cylindrical battery cells, each cylindrical battery cell comprising an elongated body with a first contact point end that is positively charged and a second contact point end that is negatively charged, the plurality of cylindrical battery cells arranged such that the first contact point ends of the plurality of cylindrical battery cells face a same direction;
   a single first copper braid placed across the first contact point ends of the plurality of cylindrical battery cells;
   a single second copper braid placed across the second contact point ends of the plurality of cylindrical battery cells; and
   one or more bands, wherein a single band from the one or more bands is wrapped around each of the plurality of cylindrical battery cells securing the first contact point end of each of the plurality of cylindrical battery cells to a portion of the single first copper braid that is in contact with the first contact point end thereby electrically connecting the first contact points ends and securing the second contact point end of each of the plurality of cylindrical battery cells to a portion of the single second copper braid that is in contact with the second contact point end thereby electrically connecting the second contact point ends.

13. The cylindrical battery cell assembly of claim 12, further comprising an adhesive for attaching the body section of each of the plurality of cylindrical battery cells to each other.

14. The cylindrical battery cell assembly of claim 13, wherein the adhesive is configured to be flexible.

15. The cylindrical battery cell assembly of claim 12, wherein the plurality of cylindrical battery cells are lithium based batteries.

16. The cylindrical battery cell assembly of claim 12, wherein the first contact point end of the plurality of cylindrical battery cells or the second contact point end of the plurality of cylindrical battery cells comprises a protrusion to form a contact point.

17. The cylindrical battery cell assembly of claim 12, wherein the first contact point end of the plurality of cylindrical battery cells or the second contact point end of the cylindrical plurality of battery cells is flush or indented.

18. The cylindrical battery cell assembly of claim 12, wherein the single first copper braid and the single second copper braid comprises a plurality of strands of conductive wire.

19. The cylindrical battery cell assembly of claim 12, wherein the one or more bands are made of a rubber.

20. The cylindrical battery cell assembly of claim 12, wherein the one or more bands are chemically adapted to withstand a temperature of greater than 170 degrees F.

21. The battery cell assembly of claim 13 further comprising a heat shrink wrap.

22. A method for mechanically connecting a plurality of cylindrical battery cells in a cylindrical battery cell assembly using one or more copper braids, one or more bands, and a wrapper, wherein each cylindrical battery cell comprises an elongated body section with a first contact point end that is positively charged and a second contact point end that is negatively charged, the method comprising:

arranging the plurality of cylindrical battery cells such that the first contact point ends of the plurality of cylindrical battery cells face a same direction;

attaching the elongated body section of each of the plurality of cylindrical battery cells to each other using an adhesive;

placing a single first copper braid across the first contact point ends of the plurality of cylindrical battery cells;

placing a single second copper braid across the second contact point ends of the plurality of cylindrical battery cells;

wrapping a single band around each of the plurality of cylindrical battery cells securing the first contact point end of each of the plurality of cylindrical battery cells to a portion of the single first copper braid that is in contact with the first contact point end thereby electrically connecting the first contact point ends and securing the second contact point end of each of the plurality of cylindrical battery cells to a portion of the single second copper braid that is in contact with the second contact point end thereby electrically connecting the second contact point ends; and     enclosing the wrapped plurality of cylindrical battery cells with a heat shrink wrapper.

23. The method of claim 22, further comprising attaching the wrapped plurality of cylindrical battery cells to a motor vehicle.

\* \* \* \* \*